Figure 1:
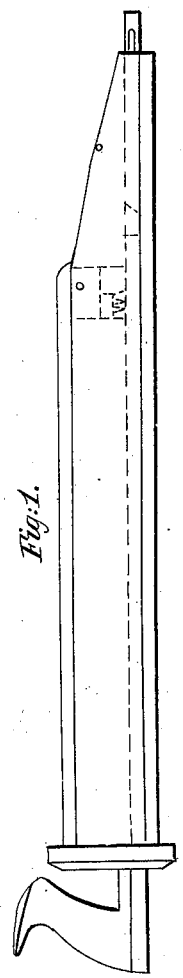
Figure 2:
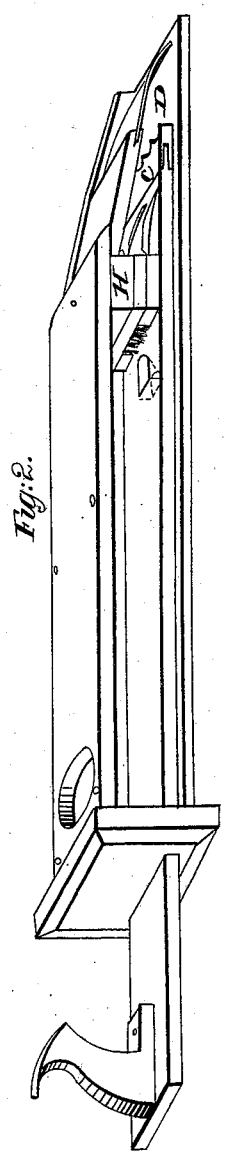
Figure 3:
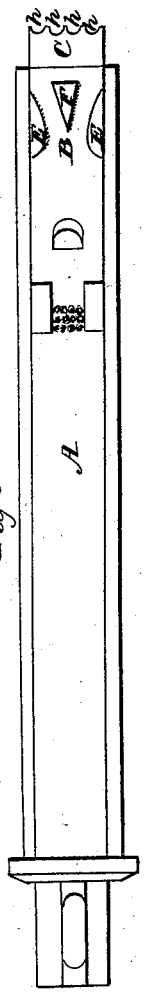

W. JENKS.

Hand-Seeder.

No. 14,504.

Patented Mar. 25, 1856.

UNITED STATES PATENT OFFICE.

WILLIAM JENKS, OF ALEXANDRIA COUNTY, VIRGINIA.

IMPROVEMENT IN HAND CORN-PLANTERS.

Specification forming part of Letters Patent No. 14,504, dated March 25, 1856.

*To all whom it may concern:*

Be it known that I, WILLIAM JENKS, of Alexandria county, State of Virginia, have invented a new and Improved Corn-Planter; and I do hereby declare that the following is a full and exact description thereof, reference being had to the accompanying drawings, and to the letters of reference marked thereon.

The nature of my invention consists in so arranging the feed and the feed slide or planter that it will distribute the seed in the planter, and the planter to distribute the seed in the ground.

To enable others skilled in the art to make and use my invention, I will proceed to describe.

No. 1 is the planter complete; No. 2, one side off, showing the inside. No. 3 has the top off, showing the inside, also the feed slide or plunger A on drawing. No. 3 is so arranged as to distribute the seed at B, and the seed falling into the chamber D below the plunger when drawn up. C is metallic point on the end of the plunger or slide, having curved or notched chambers $h$ at the lower end, as shown in the drawings, for the purpose of taking the seed distributed in chamber D into the ground at each descent of the slide A.

E E are the bolsters or stops on the plunger. F is the distributer. G is the brush. H is the brush or feed block.

Having thus described my invention, what I claim as new, and desire to secure by Letters Patent, is—

The bolsters E and distributer F, in combination with the point C, when arranged and operated for the purpose herein specified.

WM. JENKS.

Witnesses:
   B. K. MORSELL,
   THOS. E. BADEN.